(12) United States Patent
Shang et al.

(10) Patent No.: US 7,200,292 B2
(45) Date of Patent: Apr. 3, 2007

(54) OPTICAL FIBER INCLINOMETER

(75) Inventors: Hen-Tai Shang, Hsinchu (CN); I-Wen Wu, Tainan (CN); Chun-Chu Yang, Kaohsiung (CN); Chih-Pi Cheng, Changhua (CN)

(73) Assignee: Prime Optical Fiber Corporation, Miao-Li (CN)

( * ) Notice: Subject to any disclaimer, the term of this patent is extended or adjusted under 35 U.S.C. 154(b) by 0 days.

(21) Appl. No.: 10/996,474

(22) Filed: Nov. 26, 2004

(65) Prior Publication Data

US 2005/0169568 A1    Aug. 4, 2005

(30) Foreign Application Priority Data

Nov. 28, 2003    (TW) .................................. 92133637

(51) Int. Cl.
*G02B 6/00* (2006.01)
*G02B 6/34* (2006.01)

(52) U.S. Cl. .............................. 385/13; 385/12; 385/37
(58) Field of Classification Search .................. 385/12, 385/13, 37
See application file for complete search history.

(56) References Cited

U.S. PATENT DOCUMENTS 5,999,671 A * 12/1999 Jin et al. ....................... 385/37
6,327,405 B1 * 12/2001 Leyva et al. .................... 385/37
6,493,486 B1 * 12/2002 Chen ............................. 385/37
6,665,062 B2 * 12/2003 Ferdinand et al. ........ 356/139.1
6,785,443 B2 * 8/2004 Mendez et al. ................ 385/37

FOREIGN PATENT DOCUMENTS

JP            2003287411 A  * 10/2003

* cited by examiner

*Primary Examiner*—Sung Pak
*Assistant Examiner*—Daniel Petkovsek
(74) *Attorney, Agent, or Firm*—Oliff & Berridge, PLC

(57) ABSTRACT

An optical fiber inclinometer comprises a pair of fiber Bragg grating devices, a fixed base, a connection plate, and a rotatable base. One end of the connection plate is fixed to the fixed base, whereas the other end of the connection plate is connected to the rotatable base through the joint of a turning pair mechanism between them. The two ends of each fiber Bragg grating device are installed onto the fixed base and the rotatable base respectively, and the two devices are mounted on the opposite side of the connection plate. Once the rotatable base rotates around the joint of the connection plate, axial tensile elongation occurs in one of the fiber Bragg grating devices, whereas axial compressive deformation occurs in the other device. The rotation angle of the rotatable base relative to the connection plate can be obtained by measuring and calculating the Bragg wavelength drifts of the pair of fiber Bragg grating devices respectively.

14 Claims, 7 Drawing Sheets

OPTICAL FIBER INCLINOMETER

BACKGROUND OF THE INVENTION

1. Field of the Invention

The present invention relates to an optical fiber inclinometer, and more particularly, to a sensor that uses fiber Bragg grating devices and thereby serves to measure the skew or inclined angle of a structure.

2. Description of the Related Art

The two basic elements of an optical fiber are its core and cladding closely covering the core. The refractive index of the core is greater than that of the cladding; therefore, light traveling inside an optical fiber is always confined to the core because total internal reflection occurs whenever light travels from a high-density medium (high refractive index area) to a low-density medium (low refractive index area). As a result, light may be transmitted a long distance in the high-density medium.

In 1987, K. O. Hill created a fiber grating, which was the first of its kind, in germanium-doped core, using argon-ion laser. Not only are fiber gratings widely applied to optical fiber communications system, but also they are commonly used in the field of measurement. In 1989, Meltz and others exposed photosensitive optical fibers to high-energy ultraviolet laser, to alter their molecular bonding and thereby increase their refractive index. Since there is periodic variation in the refractive index of the optical fibers along axial directions, this device is also known as fiber Bragg grating (FBG).

FIG. 1 is a perspective diagram of an optical fiber 10 having fiber Bragg gratings. The optical fiber 10 contains a core 13 of total length L, and coverings over the core 13 are a cladding 12 and a protective layer 11 in sequence. An incident ray 14 enters the core 13 at the left end and exits from the right end to have a transmitted ray 15. Owing to a regular periodic variation of refractive index along the axis of the optical fiber 10, the incident ray 14 of a specific wavelength cannot pass the core 13 and is reflected and returns to the original point of incidence (the left end).

FIG. 2(a) is a diagram showing wavelength distribution of the incident ray and reflected ray in FIG. 1. The incident ray 14 comprises light of a certain broad range of wavelengths, whereas the reflected ray 16 comprises light of a specific wavelength $\lambda_{b1}$ which belongs to the fixed narrow range of wavelengths, thus the light of wavelength $\lambda_{b1}$ is missing from the transmitted ray 15. The wavelength $\lambda_{b1}$ is called the Bragg wavelength, as shown in FIG. 2(b).

If the optical fiber 10 is subjected to temperature variation or an external force and thereby causing an extension $\Delta L$ in the axial direction, the Bragg wavelength shifts from $\lambda_{b1}$ to $\lambda_{b2}$, as shown in FIG. 3. Compression may otherwise occur, making the Bragg wavelength shifts from $\lambda_{b2}$ to $\lambda_{b3}$. Hence, the following equation is obtained.

$$\frac{\lambda_{b2} - \lambda_{b1}}{\lambda_{b1}} = K_t \times \Delta T + K_e \times \varepsilon$$

Where $\Delta T$ denotes temperature difference, $K_t$ denotes temperature sensitivity coefficient, $K_e$ denotes strain sensitivity coefficient, and $\varepsilon$ denotes axial strain, or the quotient of $\Delta L$ divided by L.

If axial strain equals $10^{-6}$ at a constant temperature, then Bragg wavelength drift $\Delta\lambda = \lambda_{b2} - \lambda_{b1}$ ranges between 0.00115 and 0.0012 nm. Since fiber Bragg grating devices may function as high-precision sensors for measuring physical variables like strain and temperature, they are widely applied to the monitoring of stress and deformation in civil structures. Unlike conventional resistive-type strain gauges which have drawbacks, such as multiple and complex cables required for each individual measurement points, and being susceptible to electromagnetic interference and susceptibility to adverse environment—humidity and high temperature for example, fiber Bragg gratings have a number of advantages, such as energy saving, long distance signal transmission, broad transmission bands, being adverse environment resistant, and, more importantly, multiple point and concurrent measurements of strain, using optical fibers characterized by single-line series connection. Therefore, fiber Bragg gratings are excellent alternatives to conventional resistive-type strain gauges on various applications, such as inclinometers or tiltmeters.

SUMMARY OF THE INVENTION

The primary objective of the present invention is to provide an optical fiber inclinometer in which fiber Bragg grating devices are applied wherein the optical fiber inclinometer is capable of measuring the tilted angles of a structure during a long-term period.

Another objective of the present invention is to provide a structurally simple optical fiber inclinometer which is compact and small in size, as it combines a small number of simple elements, making it cost competitive.

To achieve the objectives, the present invention discloses an optical fiber inclinometer that comprises a pair of fiber Bragg grating devices, a fixed base, a connection plate, and a rotatable base. One end of the connection plate is installed onto the fixed base, whereas the other end of the connection plate is connected to the rotatable base through the joint of a turning pair mechanism between them. The two ends of each fiber Bragg grating device are fixed to the fixed base and the rotatable base respectively, and the two devices are mounted on the opposite side of the connection plate. Once the rotatable base rotates around the joint of the connection plate, axial tensile deformation occurs in one of the fiber Bragg grating devices, whereas axial compression deformation occurs in the other device. The rotation angle of the rotatable base relative to the connection plate can be obtained by measuring and calculating the Bragg wavelength drifts of the pair of fiber Bragg grating devices respectively.

The present invention further provides an optical fiber inclinometer that comprises at least three fiber Bragg grating devices, a fixed base, a connection post, and a rotatable base. One end of the connection post is fixed to the base, whereas the other end of the connection post is connected to the rotatable base through the joint of a spherical pair or ball joint mechanism between them. The two ends of each fiber Bragg grating device are installed onto the fixed base and the rotatable base respectively. The devices are mounted on the outer circumference of the connection post in an equiangular manner, respectively.

Once the rotatable base rotates around the joint of the connection post, axial tensile deformation occurs in the fiber Bragg grating devices at some angular positions, whereas axial compression deformation occurs in the devices at other angular positions. The two-dimensional angles of rotation of the rotatable base relative to the connection post can be obtained by measuring and calculating the Bragg wavelength drifts of the fiber Bragg grating devices respectively and then calculating the difference between the two drifts.

The difference between the drifts of the two fiber Bragg grating devices is deemed the basis of tilted angle calculation and thus the thermal effect on the fiber Bragg grating devices is cancelled out. Hence, the present invention is applicable to cases found in harsh outdoor environments.

BRIEF DESCRIPTION OF THE DRAWINGS

The invention will be described according to the appended drawings in which.

PREFERRED EMBODIMENT OF THE PRESENT INVENTION

Figure 1:
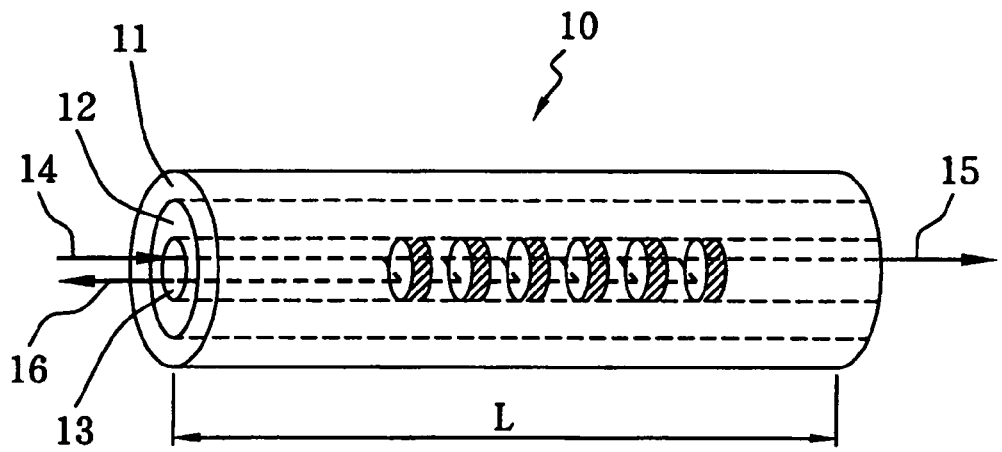
FIG. 1 is a perspective diagram of an optical fiber having fiber Bragg gratings in accordance with the present invention.
Figure 2A:
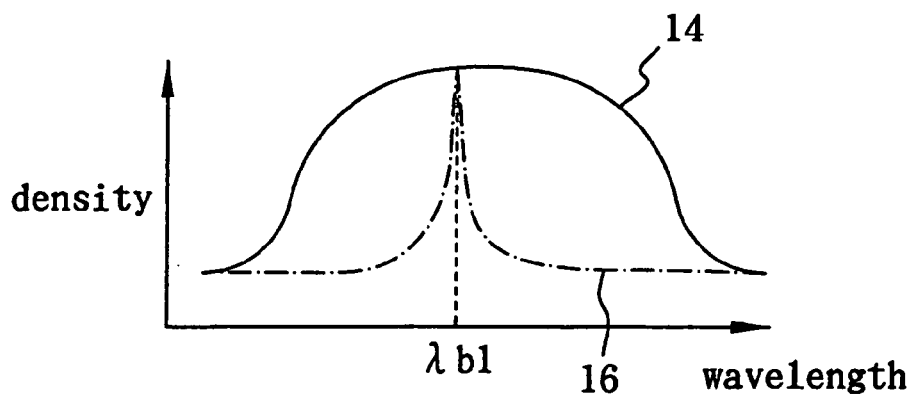
FIG. 2(a) is a diagram showing wavelength distribution of the incident ray and reflected ray in FIG. 1.
Figure 2B:
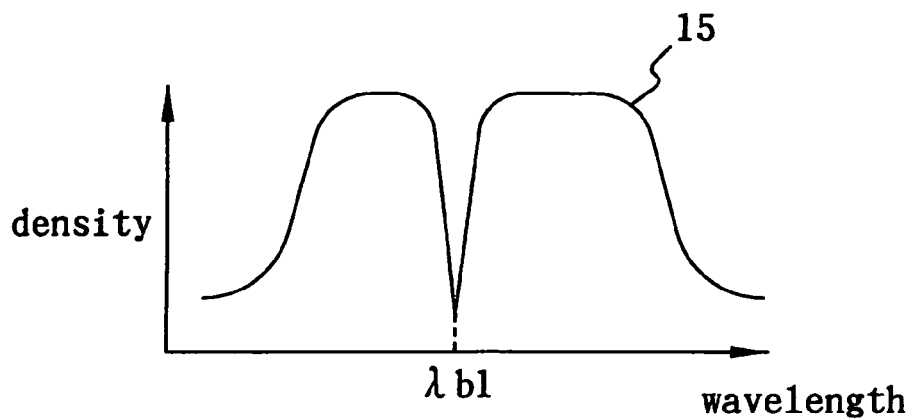
FIG. 2(b) is a diagram showing wavelength distribution of the transmitted ray in FIG. 1.
Figure 3:
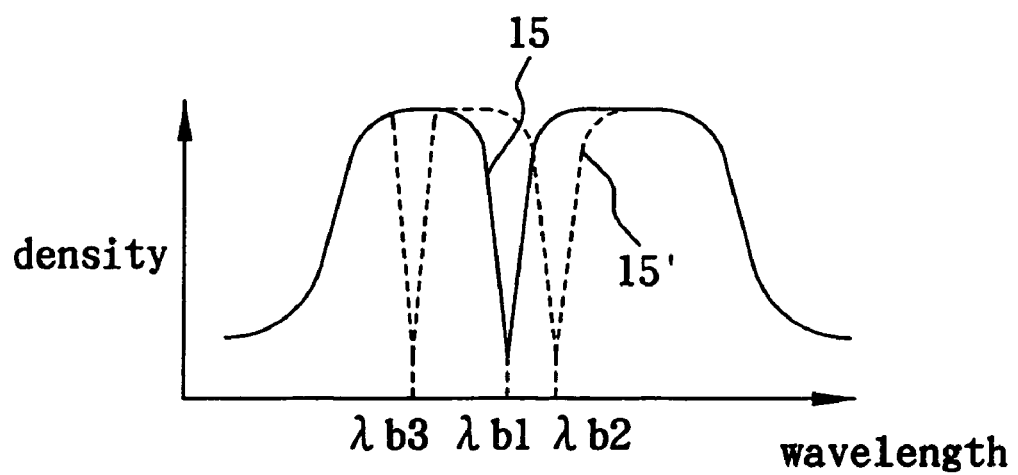
FIG. 3 is a schematic diagram showing the Bragg wavelength shifts of the transmitted ray in FIG. 1.
Figure 4:
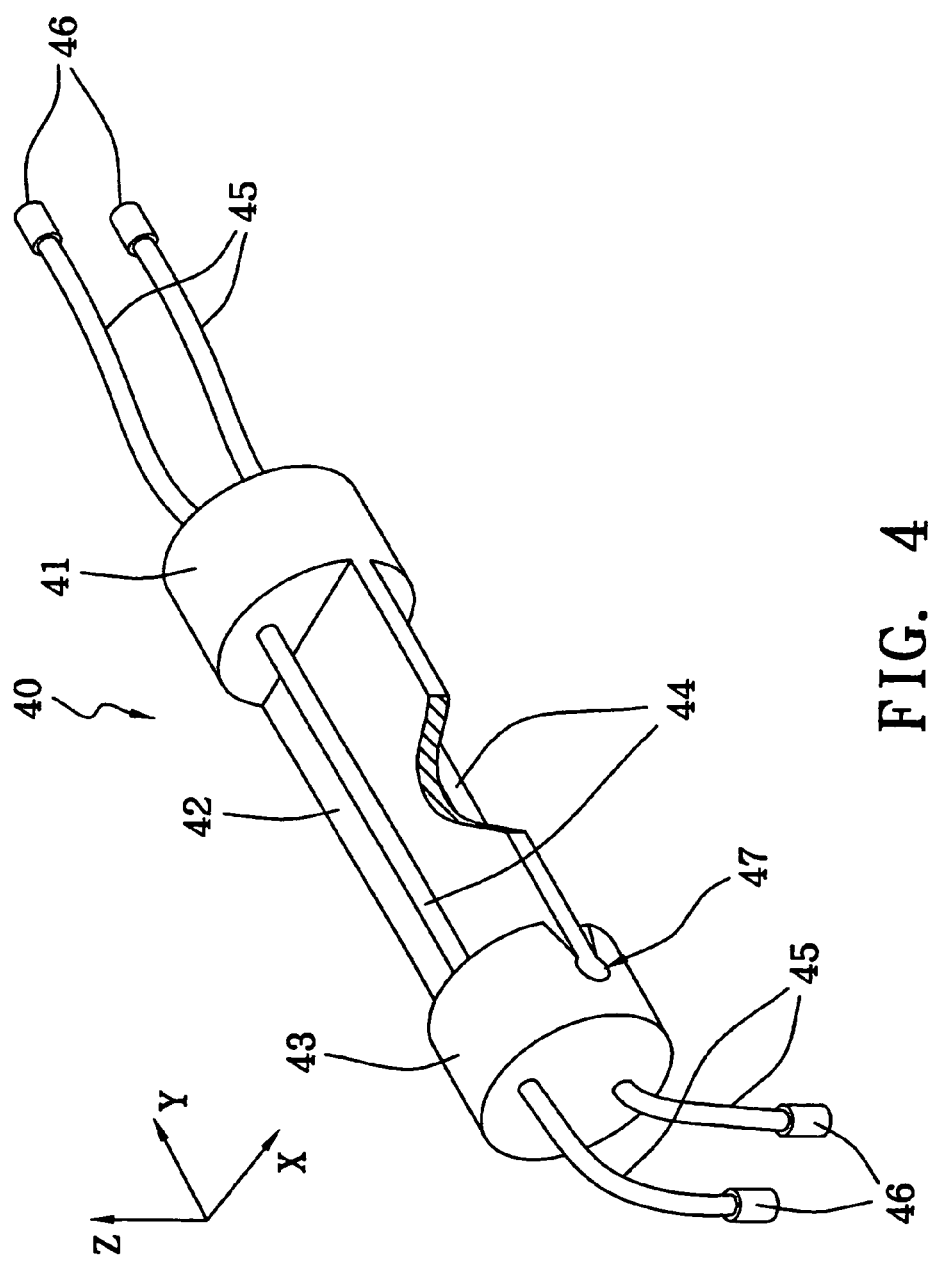
FIG. 4 is a perspective diagram of an optical fiber inclinometer in accordance with the present invention.

FIG. 4 is a perspective diagram of an optical fiber inclinometer 40 in accordance with the present invention. The optical fiber inclinometer 40 comprises a pair of fiber Bragg grating devices 44, a fixed base 41, a connection plate 42, and a rotatable base 43. One end of the connection plate 42 is fixed to the fixed base 41, whereas the other end of the connection plate 42 is connected to the rotatable base 43 through a turning pair mechanism 47 as a joint between them. Relative motion between the rotatable base 43 and the connection plate 42 is the rotation of one degree of freedom, or, in other words, relative angular displacement takes place (along the X axis) in the direction perpendicular to the side of the connection plate 42.

The two ends of each fiber Bragg grating device 44 are installed onto the fixed base 41 and the rotatable base 43 respectively, and the two fiber Bragg grating devices 44 are mounted on opposite sides of the connection plate 42 respectively. Fiber extensions 45 extend from the two ends of each fiber Bragg grating device 44 and through the fixed base 41 and the rotatable base 43 respectively. Each terminal of the fiber extensions 45 is equipped with a connector 46 intended for serial connection.

It is necessary to allow for appropriate pre-tension stress when both ends of each fiber Bragg grating device 44 are installed. It is also important to prevent the fiber Bragg grating device 44 on either side from slacking under compression so that the fiber Bragg grating devices 44 stay taut while being measured for the tilted angle of a structure. Once the rotatable base 43 rotates around the turning pair mechanism 47, axial tensile elongation occurs in one of the fiber Bragg grating devices 44, whereas axial compressive deformation occurs in the other device. The rotation angle of the rotatable base 43 relative to the connection plate 42 can be obtained by measuring and calculating the difference between the Bragg wavelength drifts $\Delta\lambda$ of the pair of fiber Bragg grating devices 44 respectively. In addition, since the pair of fiber Bragg grating devices 44 lie in symmetric positions, variations in stress arising from variations in temperature offset each other.

Figure 5:
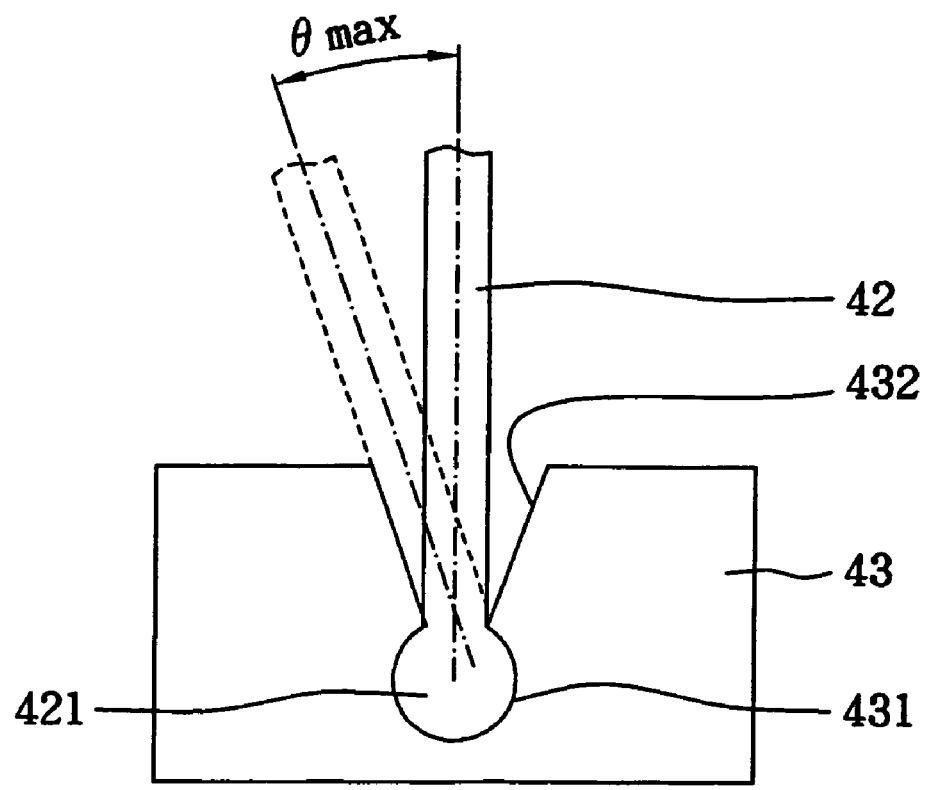
FIG. 5 is a magnified schematic diagram of the turning pair mechanism in FIG.4.

FIG. 5 is a magnified schematic diagram of the turning pair mechanism 47 in FIG. 4. The turning pair mechanism 47 comprises the cylinder 421 installed on the end surface of the connection plate 42, and further comprises the V-shaped groove 432 and the holding member 431 installed on the surface of the rotatable base 43. The holding member 431 holds the cylinder 421 exactly, and allows the cylinder 421 and the connection plate 42 to rotate in the direction vertical to the drawing page. In general, the cut angle of the V-shaped groove 432 limits the maximum relative angular displacement $\theta_{max}$ of the connection plate 42 to 2° approximately.

Figure 6:
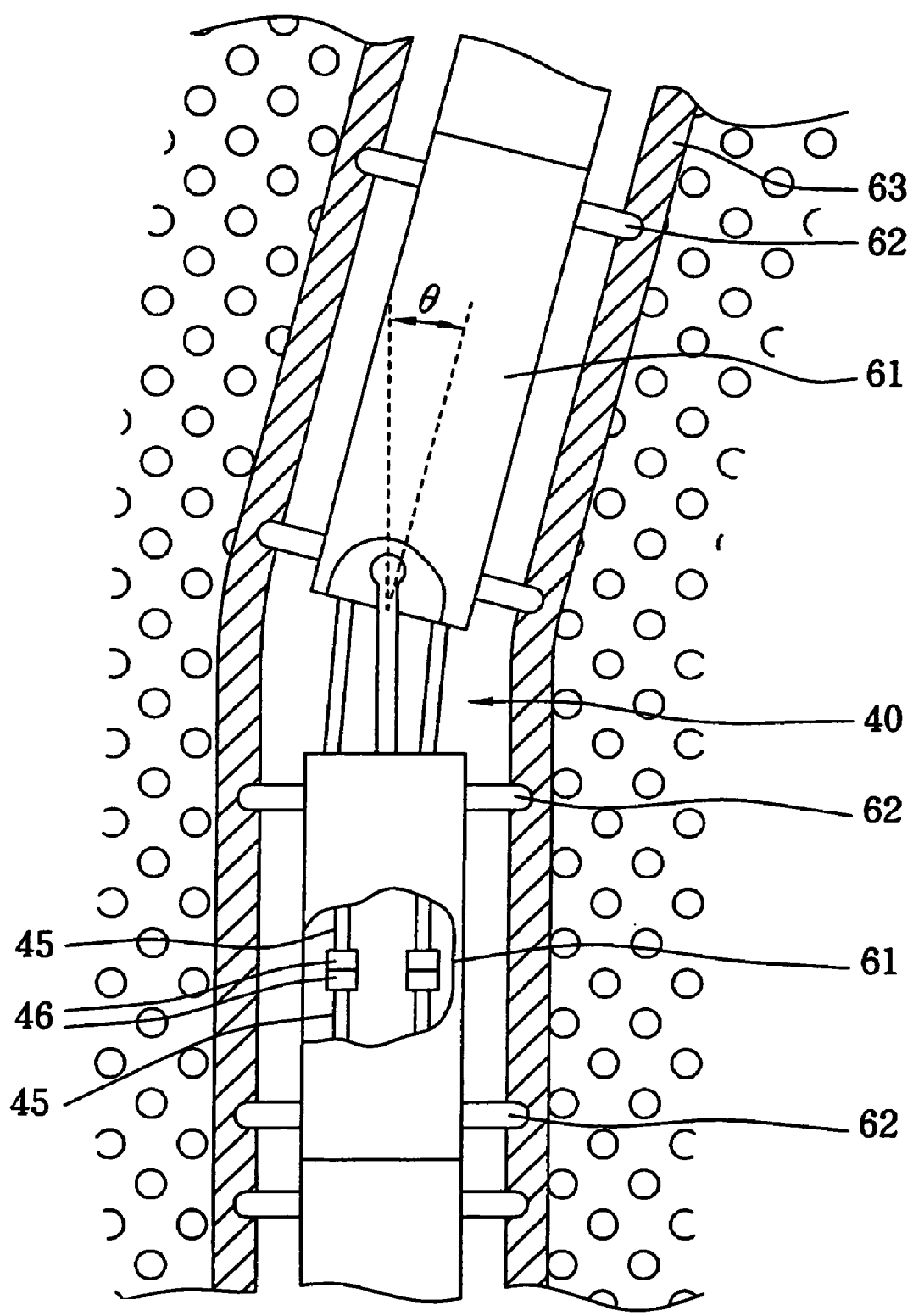
FIG. 6 is a schematic diagram of measurement of tilted angles of a title tube inside a borehole in soil by means of the optical fiber inclinometer in FIG. 4.

The optical fiber inclinometer 40 of the present invention may further be applied to the monitoring of the stability of hillsides during deep excavation of tunnels, buildings and dams, or it may further be applied to long-term monitoring of landslides, mudslides, and slope bed displacement. FIG. 6 is a schematic diagram of measurement of tilted angles inside a borehole in soil, using the optical fiber inclinometer 40. FIG. 6 depicts a tilted tube 63 embedded in the borehole to enable the optical fiber inclinometer 40 and its exterior to slide, along the inner wall of the tilted tube 63 or a guiding groove, to a point deep underground. Both the fixed base 41 and the rotatable base 43 have a rigid pipe 61 installed on their face-to-face sides for the sake of connection and protection. Connectors 46 of adjacent optical fiber inclinometers 40 are linked inside the rigid pipes 61. Hence, it is feasible to measure concurrently the continuous variations at tilted angles from the ground to a point deep underground, using a combination of several dozens of optical fiber inclinometers 40 and several dozen rigid pipes 61. Furthermore, a plurality of guiding pins 62 or pulleys are installed on the rigid pipes 61. The surrounding holding pins or guiding pins 62 stay so close to the inner wall of the tilted tube 63 or the guiding groove that, the optical fiber inclinometers 40 and the related portion of tilted tube 63 are still parallel to each other, but angular displacement $\theta$ occurs at the rotatable base 43 to reflect the tilted angle of the tilted tube 63.

Figure 7:
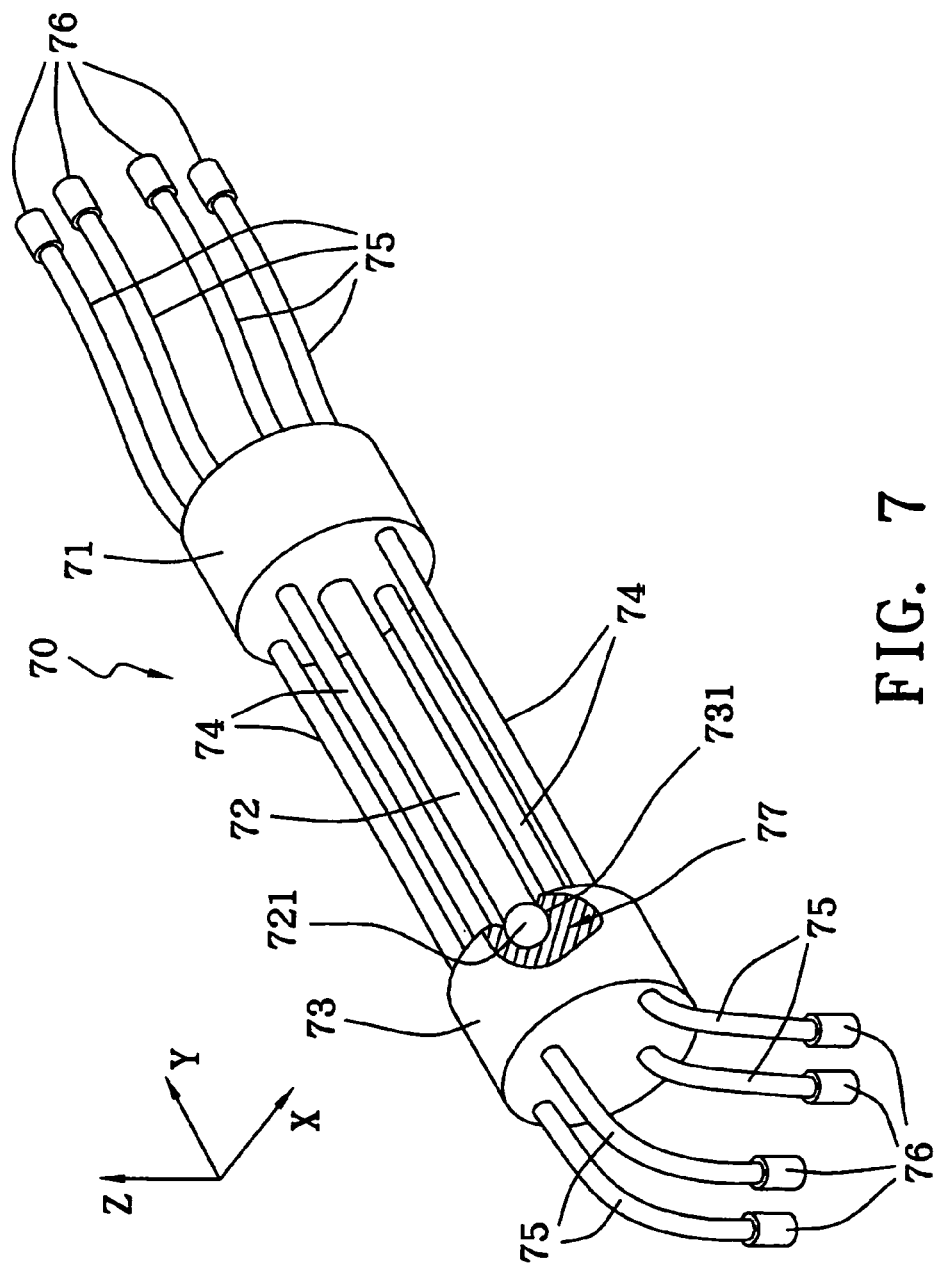
FIG. 7 is a perspective diagram of another optical fiber inclinometer in accordance with the present invention.

FIG. 7 is a perspective schematic diagram of another optical fiber inclinometer 70 in accordance with the present invention. The optical fiber inclinometer 70 comprises four fiber Bragg grating devices 74, a fixed base 71, a connection post 72, and a rotatable base 73. One end of the connection post 72 is fixed to the fixed base 71, whereas the other end of the connection post 72 is connected to the rotatable base 73 through a spherical pair or ball joint mechanism 77 as a joint of them. Relative motion between the rotatable base 73 and the connection post 72 is the rotation of two degrees of freedom, or, in other words, angular displacement takes place along the X axis and Z axis.

The two ends of each fiber Bragg grating device 74 are installed onto the fixed base 71 and the rotatable base 73 respectively, and the two fiber Bragg grating devices 74 are mounted on opposite sides of the connection post 72 respectively. Fiber extensions 75 extend from the two ends of each fiber Bragg grating device 74 and through the fixed base 71 and the rotatable base 73 respectively. Each terminal of the fiber extensions 75 is equipped with a connector 76 intended for serial connection.

It is necessary to allow for appropriate pre-tension stress when both ends of each fiber Bragg grating device 74 are fixed. It is also important to prevent the fiber Bragg grating device 74 on either side from slacking under compression so that the fiber Bragg grating devices 74 stay taut while being measured for the tilted angles of the a structure. Once the rotatable base 73 rotates around the ball joint mechanism 77, axial tensile elongation occurs in some fiber Bragg grating devices 74, whereas axial compressive deformation occurs in the other devices. The rotation angle of the rotatable base 73 relative to the connection plate 72 can be obtained by measuring and calculating the Bragg wavelength drifts $\Delta\lambda$ of the fiber Bragg grating devices 74 respectively.

The ball joint mechanism 77 comprises the sphere 721 installed on the end surface of the connection post 72 and the holding member 731 installed on the rotatable base 73. The holding member 731 holds the sphere 721 exactly, and it allows the sphere 721 and the connection post 72 to rotate in the direction of the Z axis and X axis.

Unlike conventional electronic inclinometer probes (IP), the optical fiber inclinometers 40 or 70 of the present invention have many advantages, such as long-term embedding of optical fiber inclinometers in metal pipes in soil to monitor variations of tilt, high sensitivity, free from electromagnetic interference, aquatic usage, needing no power supply at a construction site, convenient and quick installation, multiple point and concurrent remote measurements, remote retrieval of detection data, ease of use, and automatic measurements recording.

Figure 8:
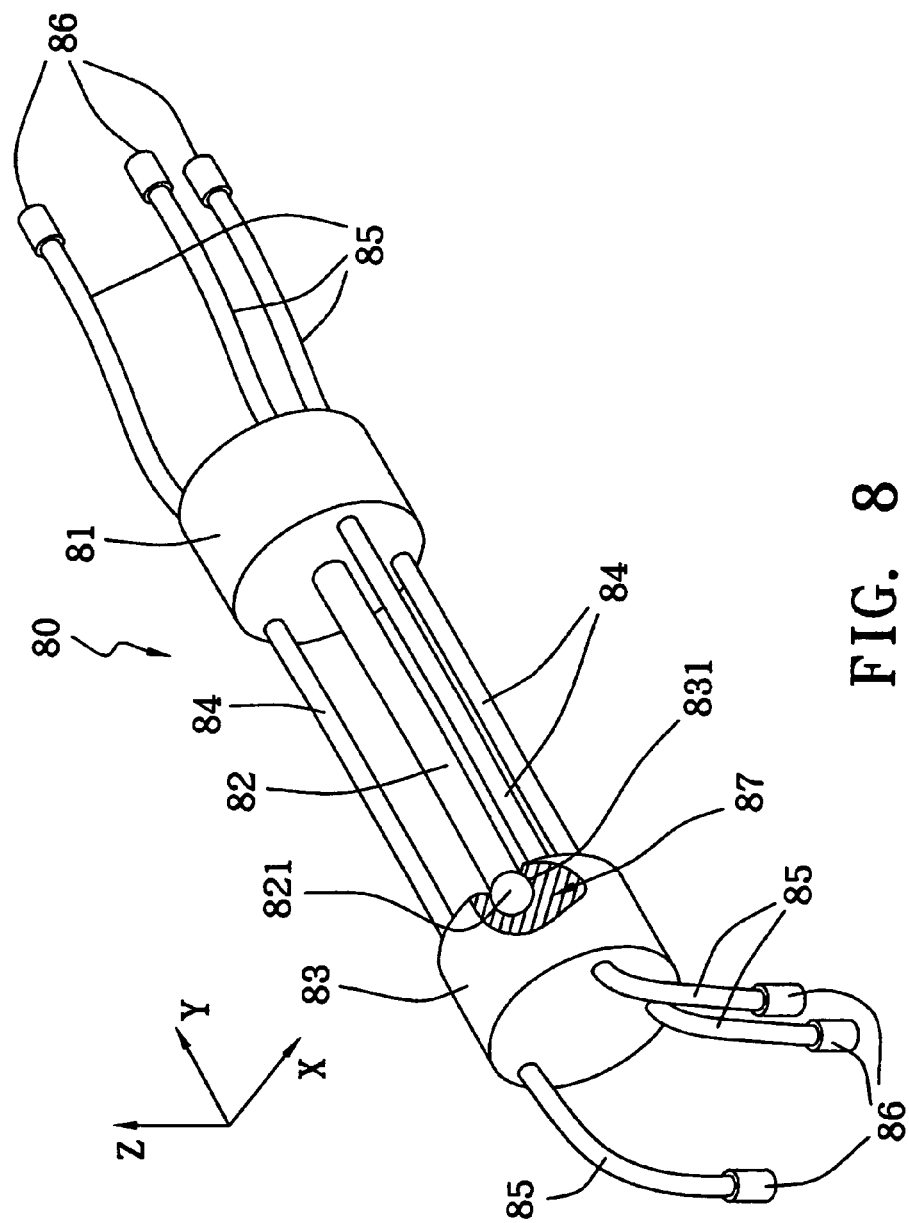
FIG. 8 is a perspective diagram of another optical fiber inclinometer in accordance with the present invention.

FIG. 8 is a perspective schematic diagram of another optical fiber inclinometer 80 in accordance with the present invention. The optical fiber inclinometer 80 comprises three fiber Bragg grating devices 84, a fixed base 81, a connection post 82, and a rotatable base 83. In comparison with FIG. 7, the present embodiment entails using the smallest number of fiber Bragg grating devices 84 to obtain the rotation angles of the rotatable base 83 in two-dimensional directions respectively, thus the present embodiment is cost competitive. One end of the connection post 82 is fixed to the fixed base 81, whereas the other end of the connection post 82 is connected to the rotatable base 83 through a spherical pair or ball joint mechanism 87 as a joint between them. Relative motion between the rotatable base 83 and the connection post 82 is the rotation of two degrees of freedom, or, in other words, angular displacement takes place along the X axis and Z axis.

The two ends of each fiber Bragg grating device 84 are installed onto the fixed base 81 and the rotatable base 83 respectively. The fiber Bragg grating devices 84 are mounted on the circumference of the outer concentric circle of the connection post 82 respectively, thus it is most appropriate for them to be fixed at equidistant angular positions or at points with the same distance from each other on the circumference. The figure shows that the fiber Bragg grating devices 84 are installed at equidistant angular positions. Fiber extensions 85 extend from the two ends of each fiber Bragg grating device 84 and through the base 81 and the rotatable base 83 respectively. Each terminal of the fiber extensions 85 is equipped with a connector 86 intended for serial connection.

It is necessary to allow for appropriate pre-tension stress when both ends of each fiber Bragg grating device 84 are installed. It is also important to prevent the fiber Bragg grating device 84 on either side from slacking under compression so that the fiber Bragg grating devices 84 stay taut while being measured for the tilted angles of a structure. Once the rotatable base 83 rotates around the ball joint mechanism 87, axial tensile elongation occurs in some fiber Bragg grating devices 84 at some angular positions, whereas axial compressive deformation occurs in some devices at other angular positions. The rotation angle of the rotatable base 83 relative to the connection post 82 can be obtained by measuring and calculating the Bragg wavelength drifts $\Delta\lambda$ of the fiber Bragg grating devices 84 respectively.

The ball joint mechanism 87 comprises the sphere 821 installed on the end surface of the connection post 82 and the holding member 831 installed on the rotatable base 83. The holding member 831 holds the sphere 821 exactly, and it allows the sphere 821 and the connection post 82 to rotate in the direction of the Z axis and X axis.

The above-described embodiments of the present invention are intended to be illustrative only. Numerous alternative embodiments may be devised by persons skilled in the art without departing from the scope of the following claims.

What is claimed is:

1. An optical fiber inclinometer, comprising:
   a fixed base;
   a connection plate including a first end fixed to the fixed base;
   a rotatable base connected to a second end of the connection plate by a turning pair mechanism serving as a joint; and
   at least two fiber Bragg grating devices respectively placed on the opposite sides of the connection plate, wherein the two ends of each of the fiber Bragg grating devices are installed onto the fixed base and the rotatable base respectively.

2. The optical fiber inclinometer of claim 1, wherein the turning pair mechanism includes a cylinder fixed to the second end of the connection plate, and a holding member installed on the rotatable base and holding the cylinder exactly to allow the rotatable base to rotate in the direction of the axis of the cylinder.

3. The optical fiber inclinometer of claim 2, wherein the rotatable base has a V-shaped groove formed on the surface of the rotatable base and connected to the holding member in order to constrain the rotation angle of the rotatable base relative to the connection plate.

4. The optical fiber inclinometer of claim 1, further comprising a fiber extension connected to one end of each of the fiber Bragg grating devices and protruding out of either the fixed base or the rotatable base.

5. The optical fiber inclinometer of claim 4, wherein the end of the fiber extension opposite to the fiber Bragg grating device is connected to a connector.

6. The optical fiber inclinometer of claim 1, further comprising two rigid pipes separately surround the fixed base and rotatable base.

7. The optical fiber inclinometer of claim 6, wherein the rigid pipes have a plurality of guiding pins on their outer walls.

8. An optical fiber inclinometer, comprising:
   a fixed base;
   a connection post including a first end fixed to the fixed base;
   a rotatable base connected to a second end on the connection post by a spherical pair mechanism serving as a joint; and
   at least three fiber Bragg grating devices respectively placed on the outer concentric circumference of the connection post, wherein the two ends of each of the fiber Bragg grating devices are installed onto the fixed base and the rotatable base respectively.

9. The optical fiber inclinometer of claim 8, wherein the spherical pair mechanism includes a sphere fixed to the second end of the connection plate and a holding member installed on the rotatable base, and the holding member holds the sphere exactly to allow the rotatable base to rotate in the direction perpendicular to the surface of the connection post.

10. The optical fiber inclinometer of claim 9, further comprising a fiber extension connected to one end of each of the fiber Bragg grating devices and protruding out of either the fixed base or the rotatable base.

11. The optical fiber inclinometer of claim 10, wherein the end of the fiber extension opposite to the fiber Bragg grating device is connected to a connector.

12. The optical fiber inclinometer of claim 8, further comprising two rigid pipes separately surrounding the fixed base and rotatable base.

13. The optical fiber inclinometer of claim 12, wherein the rigid pipes have a plurality of guiding pins on their outer walls.

14. The optical fiber inclinometer of claim 8, wherein the fiber Bragg grating devices are respectively placed on the outer concentric circumference of the connection post in an equiangular manner.

* * * * *